(12) United States Patent
Kurita et al.

(10) Patent No.: US 11,769,248 B2
(45) Date of Patent: Sep. 26, 2023

(54) IMAGE PROCESSING DEVICE, IMAGE PROCESSING METHOD, AND IMAGE PROCESSING NON-TRANSITORY COMPUTER READABLE MEDIUM FOR VERIFYING DETECTABLE RANGE OF DEFECT IMAGE

(71) Applicant: OMRON Corporation, Kyoto (JP)

(72) Inventors: Masashi Kurita, Kizugawa (JP); Yasuyuki Ikeda, Moriyama (JP); Sakon Yamamoto, Tokyo (JP)

(73) Assignee: OMRON Corporation, Kyoto (JP)

( * ) Notice: Subject to any disclaimer, the term of this patent is extended or adjusted under 35 U.S.C. 154(b) by 312 days.

(21) Appl. No.: 17/270,441

(22) PCT Filed: Oct. 23, 2019

(86) PCT No.: PCT/JP2019/041426
§ 371 (c)(1),
(2) Date: Feb. 23, 2021

(87) PCT Pub. No.: WO2020/137121
PCT Pub. Date: Jul. 2, 2020

(65) Prior Publication Data
US 2021/0183037 A1 Jun. 17, 2021

(30) Foreign Application Priority Data
Dec. 28, 2018 (JP) .................................. 2018-247166

(51) Int. Cl.
*G06T 7/00* (2017.01)
*G06T 3/00* (2006.01)
(Continued)

(52) U.S. Cl.
CPC ............ *G06T 7/001* (2013.01); *G06T 3/0006* (2013.01); *G06T 3/40* (2013.01); *G06T 5/009* (2013.01);
(Continued)

(58) Field of Classification Search
CPC .................. G06T 7/0004; G06T 7/001; G06T 2207/20212; G06T 2207/20221;
(Continued)

(56) References Cited

U.S. PATENT DOCUMENTS

2004/0230883 A1 11/2004 Saito
2012/0141012 A1* 6/2012 Sakai ................. G01N 21/9501
382/149

FOREIGN PATENT DOCUMENTS

JP H1114553 1/1999
JP 2004333451 11/2004
(Continued)

OTHER PUBLICATIONS

"International Search Report (Form PCT/ISA/210) of PCT/JP2019/041426," dated Jan. 21, 2020, with English translation thereof, pp. 1-4.
(Continued)

*Primary Examiner* — Li Liu
(74) *Attorney, Agent, or Firm* — JCIPRNET

(57) ABSTRACT

This image processing device, by superimposing a defect image 52 on a background image 51, with the original image of an inspection subject as the background image 51, and performing image processing in which the display format of the defect image 52 or the display format of the background
(Continued)

image 51 is altered, a plurality of composite images 50 having different ways of seeing the defect image 52 with respect to the background image 51 are generated (step 403), the advisability of detecting the defect image 52 from each of the plurality of composite images 50 is verified (step 404), the detectable range 60 of the defect image 52 is estimated on the basis of the detection advisability verification results (step 405), and the detectable range 60 is displayed (step 406).

17 Claims, 6 Drawing Sheets

(51) Int. Cl.
*G06T 3/40* (2006.01)
*G06T 5/00* (2006.01)
*G06T 5/50* (2006.01)
*G06T 11/40* (2006.01)

(52) U.S. Cl.
CPC ............... *G06T 5/50* (2013.01); *G06T 11/40* (2013.01); *G06T 2207/20221* (2013.01); *G06T 2207/30108* (2013.01)

(58) Field of Classification Search
CPC ........... G06T 2207/30108; G06T 2207/30168; G06V 10/752
See application file for complete search history.

(56) References Cited

FOREIGN PATENT DOCUMENTS

| | | |
|---|---|---|
| JP | 2013142558 | 7/2013 |
| JP | 2013257197 | 12/2013 |
| JP | 2015197928 | 11/2015 |
| JP | 2018032410 | 3/2018 |
| JP | 2018087745 | 6/2018 |
| JP | 2018205123 | 12/2018 |
| WO | 0141068 | 6/2001 |

OTHER PUBLICATIONS

"Written Opinion of the International Searching Authority (Form PCT/ISA/237) of PCT/JP2019/041426," dated Jan. 21, 2020, with English translation thereof, pp. 1-7.

"Search Report of Europe Counterpart Application", dated Oct. 6, 2022, p. 1-p. 10.

* cited by examiner

| | DEFECTIVE PARAMETER | | | | | | | | |
|---|---|---|---|---|---|---|---|---|---|
| | SHAPE | | | SIZE | | | CONTRAST RATIO | | |
| | A | B | C | LARGE | MIDDLE | SMALL | HIGH | MIDDLE | LOW |
| BACKGROUND PARAMETER | TEXTURE PATTERN | X | | | | | | | |
| | | Y | | | | | | | |
| | | Z | | | | | | | |
| | BRIGHTNESS | HIGH | | | | | | | |
| | | MIDDLE | | | | | | | |
| | | LOW | | | | | | | |

FIG. 5

IMAGE PROCESSING DEVICE, IMAGE PROCESSING METHOD, AND IMAGE PROCESSING NON-TRANSITORY COMPUTER READABLE MEDIUM FOR VERIFYING DETECTABLE RANGE OF DEFECT IMAGE

CROSS-REFERENCE TO RELATED APPLICATION

This application is a 371 application of the International PCT application serial no. PCT/JP2019/041426, filed on Oct. 23, 2019, which claims the priority benefits of Japan Patent Application No. 2018-247166, filed on Dec. 28, 2018. The entirety of each of the above-mentioned patent applications is hereby incorporated by reference herein and made a part of this specification.

TECHNICAL FIELD

The invention relates to an image processing device, an image processing method, and an image processing program.

BACKGROUND ART

In the manufacturing field of industrial products, an inspection method of evaluating the presence or absence of defects in products or their degree through visual inspection that applies an image processing technique has been put into practical use. In this type of inspection field, an inspection accuracy is improved by application of machine learning, and for example, a method of detecting defects from an image of an inspection subject using a trained model trained to identify defect-specific feature images through a convolutional neural network is used. As a method of detecting a defect image by such machine learning, for example, as described in Patent Literature 1, there is a known visual inspection device that optimizes a threshold value for defining a condition for detecting a defect from an inspection subject, by comparing a registered image of a non-defective product with an image of the inspection subject.

CITATION LIST

Patent Literature

Patent Literature 1

Japanese Patent Laid-Open No. 2013-142558

SUMMARY OF INVENTION

Technical Problem

In such a visual inspection, although a detectable range (for example, a minimum width or a minimum area of a defect) of a defect image of a specific inspection subject under standard imaging conditions is known, when the imaging conditions change or the inspection subject changes, a way of seeing the defect (a reflected status of the defect) also changes. For example, when a contrast ratio between a defect and its background changes in response to a change in intensity of light that illuminates the inspection subject, a minimum width of the detectable defect can also change. Therefore, the performance equivalent to the detection performance of the defect image of a specific inspection subject under standard imaging conditions is not always exhibited under all imaging conditions and for all inspection subjects.

As a means for verifying the detectable range of the defect image of all the inspection subjects under all imaging conditions, for example, it is conceivable to actually prepare a sample of a defective product and try to detect the defect image under all imaging conditions. However, preparation of such a sample is troublesome and it is difficult to cover all imaging conditions. Also, it is difficult to estimate the detectable range of the defect image of other inspection subjects under specific imaging conditions from the detectable range of the defect image of a specific inspection subject under standard imaging conditions.

Therefore, an object of the invention is to provide an image processing device, an image processing method, and an image processing program capable of solving such a problem and verifying the detectable range of a defect image of an inspection subject under all imaging conditions.

Solution to Problem

In order to solve the above-mentioned problems, an image processing device according to the invention includes a unit which superimposes a defect image on a background image with an original image of an inspection subject as the background image and performs image processing for altering a display format of the defect image or a display format of the background image, thereby generating a plurality of composite images having different ways of seeing the defect image with respect to the background image; a unit which verifies whether the defect image is detectable from each of the plurality of composite images; a unit which estimates a detectable range of the defect image based on a result of verifying whether the defect image is detectable; and a unit which displays the detectable range. By performing image processing for altering the display format of the defect image or the display format of the background image, it is possible to verify the detectable range of the defect image of all the inspection subjects under all imaging conditions.

The image processing for altering the display format of the defect image may include a process of altering a shape of the defect image, a process of altering a position or a posture of the defect image with respect to the background image, a process of altering a size of the defect image, a process of enlarging or reducing the defect image, or a process of altering a ratio of a contrast of the defect image to that of the background image. By altering the display format of the defect image, the way of viewing the defect image with respect to the background image can be altered.

The image processing for altering the display format of the background image may include a process of altering a texture pattern of the background image, a process of altering a brightness of the background image, a process of superimposing a noise pattern on the background image, a process of superimposing a shadow pattern on the background image, a process of rotating the background image with respect to the defect image, a process of enlarging or reducing the background image, or a process of altering the contrast ratio of the background image with respect to the defect image. By altering the display format of the background image, the way of viewing the defect image with respect to the background image can be altered.

The image processing device according to the invention may further include a unit which sets a threshold value of a feature amount of the defect image which defines a condition for detecting the defect image as a defect, based on a detectable range. As a result, the threshold setting can be optimized.

An image processing method according to the invention causes a computer system to execute a step of superimposing a defect image on a background image with an original image of an inspection subject as the background image and performing image processing for altering a display format of the defect image or a display format of the background image, thereby generating a plurality of composite images having different ways in which the defect image is seen with respect to the background image; a step of verifying whether the defect image is detachable from each of the plurality of composite images; a step of estimating a detectable range of the defect image based on a verifying result of whether the defect image is detectable; and a step of displaying the detectable range. By performing image processing for altering the display format of the defect image or the display format of the background image, it is possible to verify the detectable range of the defect image of all the inspection subjects under all imaging conditions.

An image processing program according to the invention causes a computer system to execute a step of superimposing a defect image on a background image with an original image of an inspection subject as the background image and performing image processing for altering a display format of the defect image or a display format of the background image, thereby generating a plurality of composite images different ways of viewing the defect image with respect to the background image; a step of verifying whether the defect image is detachable from each of the plurality of composite images; a step of estimating a detectable range of the defect image based on a verifying result of whether the defect image is detectable; and a step of displaying the detectable range. By performing image processing for altering the display format of the defect image or the display format of the background image, it is possible to verify the detectable range of the defect image of all the inspection subjects under all imaging conditions.

Advantageous Effects of Invention

According to the invention, it is possible to verify the detectable range of a defect image of all the inspection subjects under all imaging conditions.

BRIEF DESCRIPTION OF DRAWINGS

FIG. 5 is an explanatory view showing an example of a table of defect parameters and background parameters according to this embodiment.

DESCRIPTION OF EMBODIMENTS

Figure 1:
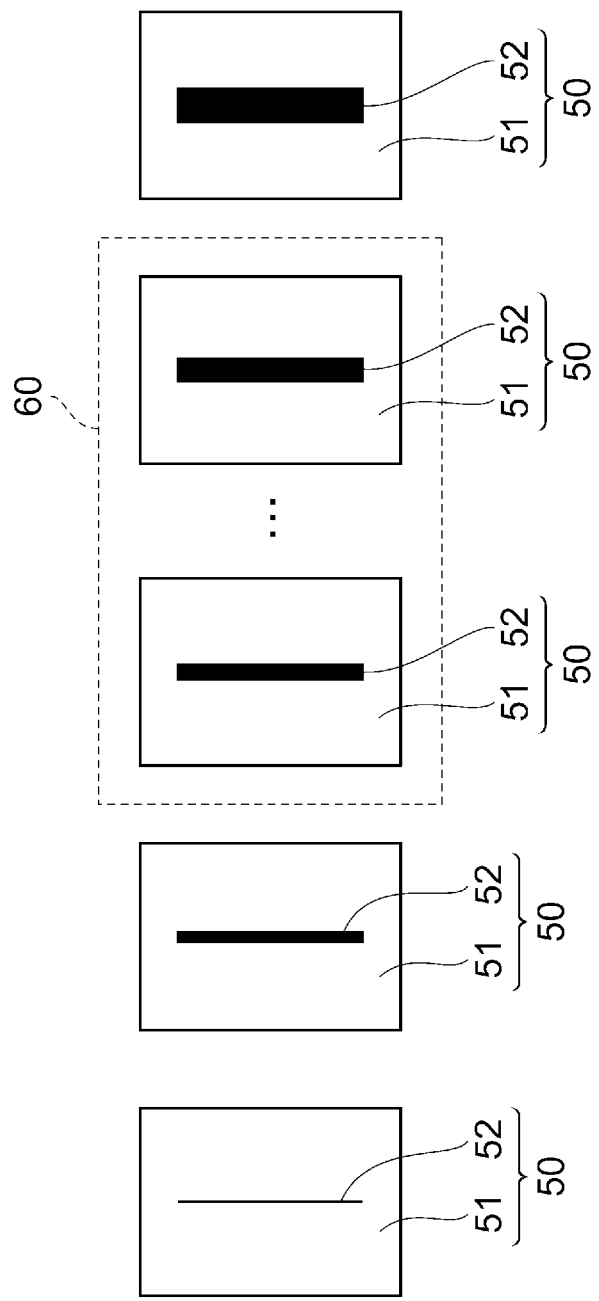
FIG. 1 is an explanatory view showing a summary of the image processing according to this embodiment.

Hereinafter, embodiments according to an aspect of the invention will be described based on the drawings. The embodiments of the invention are intended to facilitate the understanding of the invention, and are not intended to limit the interpretation of the invention. The invention can be modified or improved without departing from the spirit thereof, and the invention also includes equivalents thereof. The same reference numerals indicate the same components, and repeated description will be omitted.

Application Example

First, an application example of the invention will be described referring to FIGS. 1 and 2.

Figure 2:
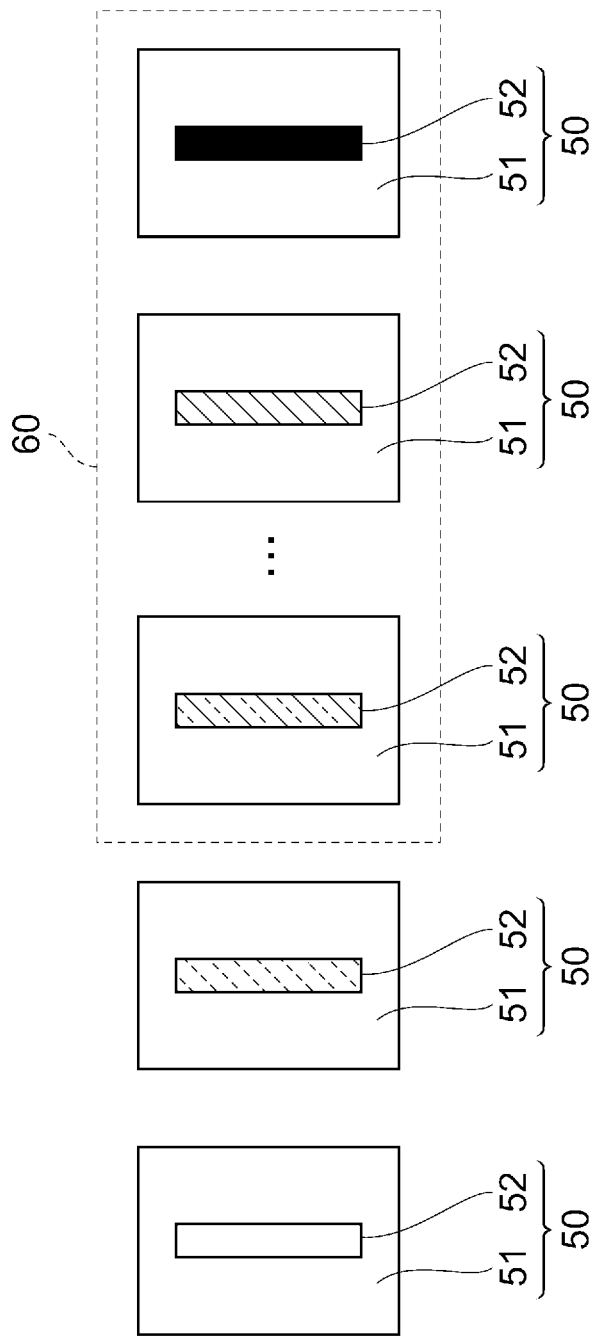
FIG. 2 is an explanatory view showing a summary of the image processing according to this embodiment.

FIGS. 1 and 2 are explanatory views showing a summary of image processing according to the present embodiment. The image processing device superimposes a defect image 52 on the background image 51 by the use of an original image of an inspection subject as a background image 51, and performs image processing of altering a display format of the defect image 52 or a display format of the background image 51, thereby generating a plurality of composite images 50 having different ways of seeing the defect image 52 with respect to the background image 52. The inspection subject is, for example, a workpiece such as a device or a part. The type of the defect image 52 may include, for example, "dirt", "scratch", "stain", and "dent". The image processing for altering the display format of the defect image 52 includes, for example, a process of altering the shape of the defect image 52, a process of altering the position or posture of the defect image 52 with respect to the background image 51, a process of altering the size of the defect image 52, a process of enlarging or reducing the size of defect image 52, or a process of altering a contrast ratio of the defect image 52 to the background image 51. The image processing for altering the display format of the background image 51 includes a process of altering a texture pattern of the background image 51, a process of altering the brightness of the background image 51, a process of superimposing a noise pattern on the background image 51, a process of superimposing a shadow pattern on the background image 51, a process of rotating the background image 51 with respect to the defect image 52, a process of enlarging or reducing the background image 51, or a process of altering the contrast ratio of the background image 51 to the defect image 52.

In the example shown in FIG. 1, the defect image 52 is a linear scratch, and a plurality of composite images 50 in which the display format of the defect image 52 is altered so that the line width gradually alters is generated. The image processing device verifies whether the defect image 52 is detectable from each of the plurality of composite images 50 shown in FIG. 1, and estimates the detectable range 60 of the defect image 52 based on the verification result. The example shown in FIG. 1 shows that the defect image 52 having a line width within the detectable range 60 can be detected, and the defect image 52 having a line width narrower than the detectable range 60 and the defect image 52 having a line width thicker than the detectable range 60 cannot be detected. When an algorithm for detecting the defect image is based on, for example, an algorithm for recognizing a feature image having a line width of a certain width or more as something other than a scratch, as shown in FIG. 1, an upper limit value can exist in the line width of the detectable scratch. In contrast, when the algorithm for detecting the defect image is based on, for example, an algorithm that recognizes all the feature images having a line width of a certain width or more as scratches, no upper limit value can exist in the line width of the detachable scratch.

On the other hand, in the example shown in FIG. 2, the defect image 52 is a linear scratch, and a plurality of composite images 50 in which the display format of the defect image 52 is altered so that the contrast ratio of the defect image 52 to the background image 51 gradually alters is generated. The image processing device verifies whether the defect image 52 is detectable from each of the plurality of composite images 50 shown in FIG. 2, and estimates the detectable range 60 of the defect image 52 based on the verification result. The example shown in FIG. 2 shows that the defect image 52 having a contrast ratio within the detectable range 60 can be detected, and the defect image 52 having a contrast ratio lower than the detectable range 60 cannot be detected.

In this way, by variously altering the display format of the defect image 52 or the display format of the background image 51, it is possible to verify the detectable range 60 of the defect image 52 of all the inspection subjects under all imaging conditions. The image processing device may display the detectable range 60 of the defect image 52 based on the verification result. As a result, the verifier can ascertain a degree of a detectable range of any kind of defect image of the inspection subject under any kind of imaging conditions.

The image processing device may automatically set a threshold value of the feature amount of the defect image 52 that defines a condition for detecting the defect image 52 as a defect based on the detectable range 60. As a result, the setting of the threshold value can be optimized. For example, if the detectable range of linear scratch is the line width in the range of 3 to 20 pixels, the threshold value of the line width that defines the condition for being detected as a defect may be set in the range of 5 to 15 pixels. In this example, the feature amount of the defect image 52 is the line width. In addition to the above-mentioned line width, the feature amount of the defect image 52 may be an area, a ferret diameter, a circumscribed rectangular principal axis length, a circumscribed rectangular sub-axis length, a main axis angle, a circularity, a needle degree, a circumscribed circle diameter, an inscribed circle diameter, a perimeter, an equivalent ellipse main axis length, an equivalent ellipse sub-axis length, an equivalent ellipse main axis sub-axis ratio, an average brightness value, a maximum brightness value, a brightness or the like, depending on the features (a shape, a color, a brightness, etc.) of the defect image 52.

[Hardware Configuration]

Figure 3:
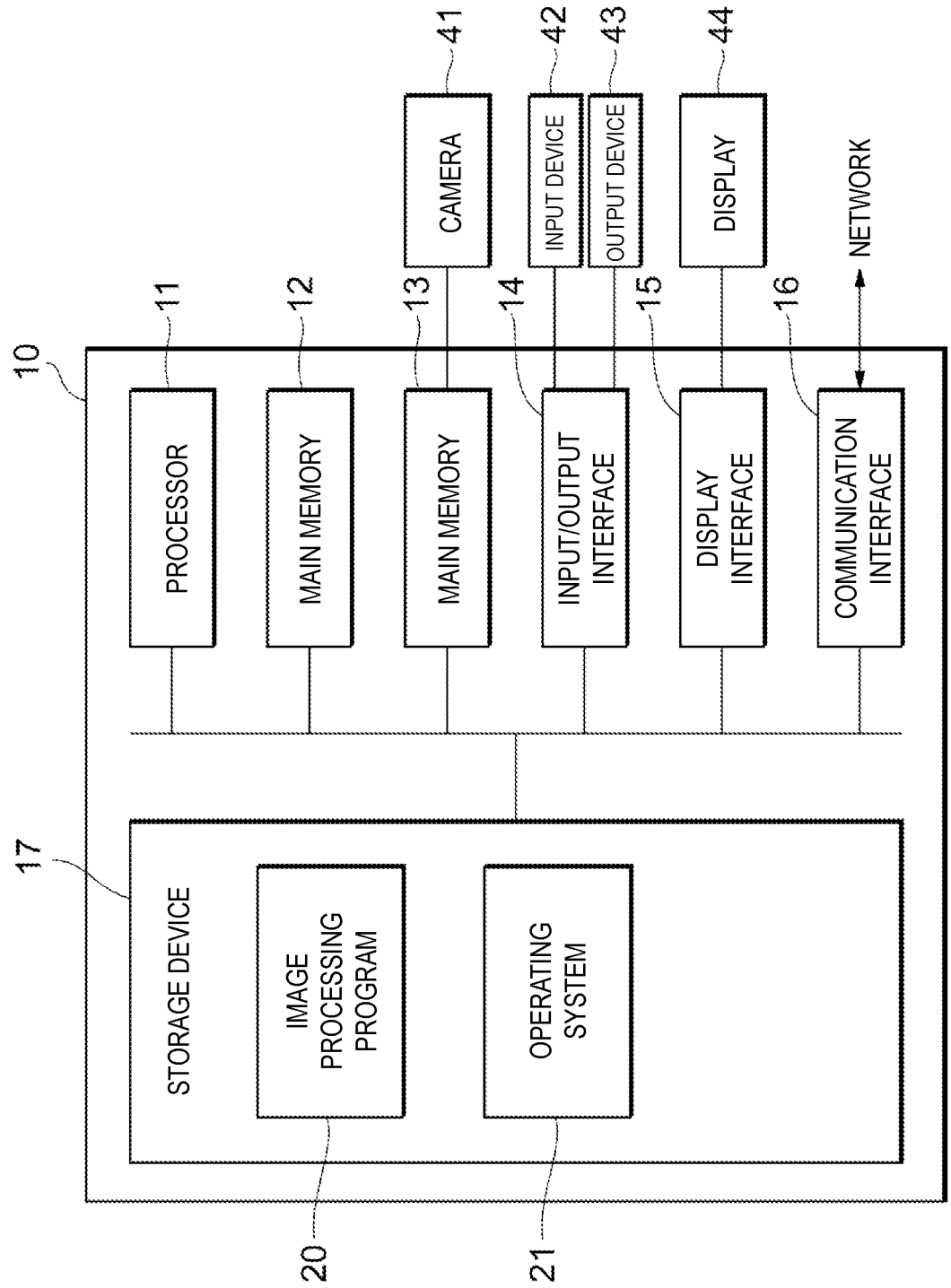
FIG. 3 is explanatory view showing an example of a hardware configuration of an image processing device according to this embodiment.

Next, an example of the hardware configuration of the image processing device 10 according to the present embodiment will be described with reference to FIG. 3.

The image processing device 10 is a computer system equipped with a processor 11, a main memory 12, a camera interface 13, an input/output interface 14, a display interface 15, a communication interface 16, and a storage device 17, as its hardware resources.

The storage device 17 is a computer-readable recording medium such as a disk medium (for example, a magnetic recording medium or an optical magnetic recording medium) or a semiconductor memory (for example, a volatile memory or a non-volatile memory). Such a recording medium can also be called, for example, a non-transient recording medium. A software program (an image processing program 20 and an operating system 21) is stored in the storage device 17. The image processing program 20 is a computer program for causing the processor 11 to execute the image processing method according to the present embodiment. When these software programs are read from the storage device 17 into the main memory 12, and interpreted and executed by the processor 11, the image processing method according to the present embodiment is executed.

A camera 41 is connected to the camera interface 13. The camera 41 may include, for example, an image sensor that captures a color image. The camera 41 may be built into the image processing device 10 or may be externally attached to the image processing device 10. The camera 41 photographs an inspection subject.

The inspection subject may be, for example, a workpiece such as a device or a part which is conveyed by a belt conveyor on the production line. The image processing device 10 may be installed on the production line, or may be installed at a place different from the production line. When the image processing device 10 is installed at a place different from the production line, the image processing device 10 may receive the image data obtained by photographing the inspection subject by the camera installed in the production line from a wired or wireless network through the communication interface 16.

An input device 42 and an output device 43 are connected to the input/output interface 14. The input device 42 is a device that receives input of various settings of the inspector (for example, an operation which is input by the inspector through a screen 70 shown in FIG. 6). The input device 42 is, for example, a keyboard, a mouse, a touch pad, or the like. The output device 43 is a device that outputs various processing results and the like. The output device 43 is, for example, a printer. A display 44 is connected to the display interface 15. The display 44 is, for example, a liquid crystal display.

[Image Processing Method]

Figure 4:
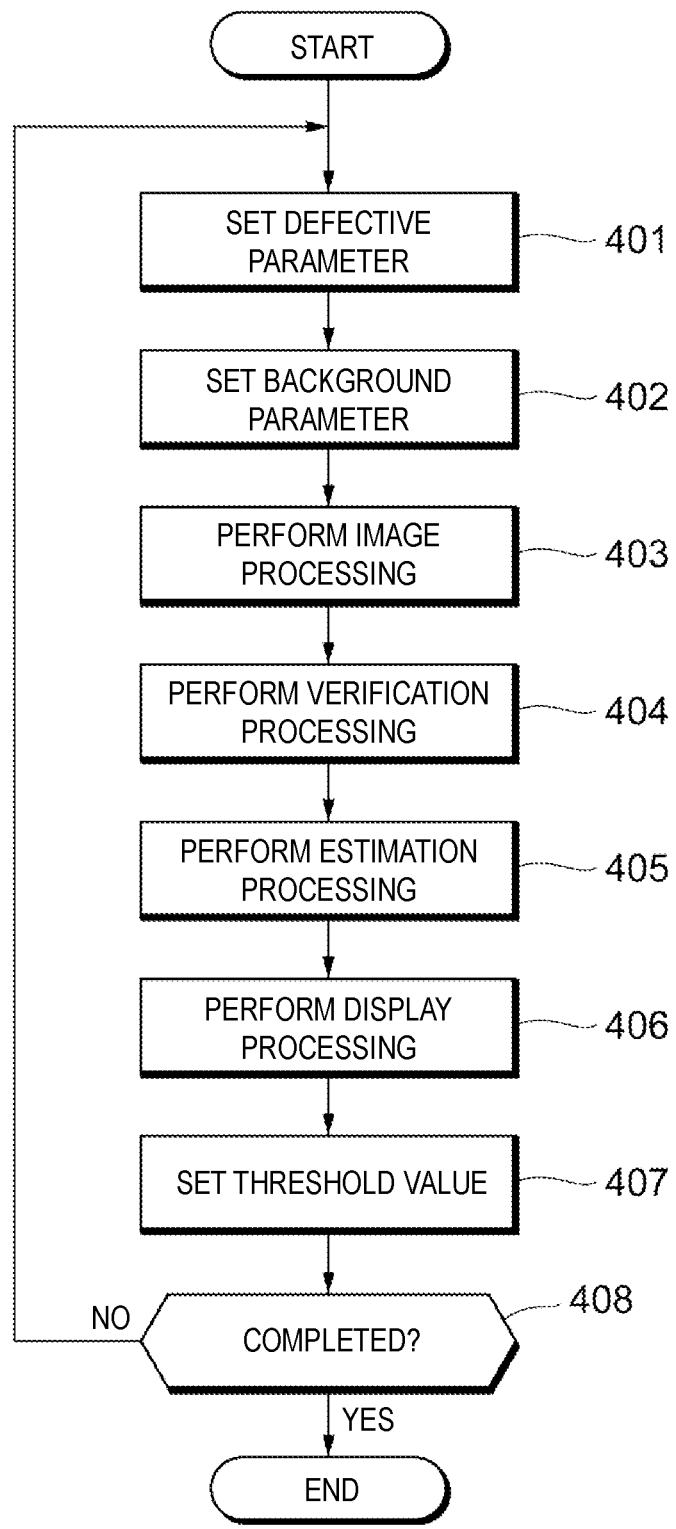
FIG. 4 is an example of a flowchart showing the flow of image processing according to this embodiment.

FIG. 4 is an example of a flowchart showing the flow of image processing according to this embodiment.

In step 401, the image processing device 10 sets a parameter (hereinafter, referred to as "defect parameter") that specifies the display format of the defect image 52. The defect parameters specify, for example, the shape of the defect image 52, the position or posture of the defect image 52 with respect to the background image 51, the size of the defect image 52, the magnification ratio or reduction ratio of the defect image 52, or the contrast ratio of the defect image 52 to the background image 51. The image processing device 10 may set the defect parameter based on the input operation from the inspector, or may automatically set the defect parameter according to the rule defined by the image processing program 20.

In step 402, the image processing device 10 sets a parameter (hereinafter, referred to as "background parameter") that specifies the display format of the background image 51. The background parameters specify, for example, the texture pattern of the background image 51, the noise pattern superimposed on the background image 51, the brightness of the background image 51, the shadow pattern superimposed on the background image 51, the rotation angle of the background image 51 with respect to the defect image 52, the magnification ratio or reduction ratio of the background image 51, or the contrast ratio of the background image 51 to the defect image 52. The image processing device 10 may set background parameters based on an input operation from the inspector, or may automatically set background parameters according to a rule defined by the image processing program 20.

In step 403, the image processing device 10 superimposes the defect image 52 on the background image 51 with the original image of the inspection subject as the background image 51, and performs the image processing of altering the display format of the defect image 52 or the display format of the background image 51 based on the defect parameters and background parameters that are each set in steps 401 and 402, thereby generating a plurality of composite images 50 having different ways of seeing the defect image 52 with respect to the background image 51. For example, in the example shown in FIG. 1, the image processing is performed to alter the shape of the defect image 52 so that the line width of the defect image 52 alters.

Here, the original image of the inspection subject may be image data of the inspection subject of a non-defective product photographed by the camera 41, or CAD (Computer Aided Design) data of the inspection subject. Further, the defect image 52 may be image data of the defect extracted from the image data of the inspection subject of a defective product photographed by the camera 41, may be image data artificially synthesized by CG (Computer Graphics), or may be the image data artificially synthesized by a painting process of an inspector.

In step 404, the image processing device 10 verifies whether the defect image 52 is detectable from each of the plurality of composite images 50. In this verification process, a general-purpose defect detection algorithm may be used.

In step 405, the image processing device 10 estimates the detectable range 60 of the defect image 52 based on the verification result of step 404. The detectable range 60 may be one of detectable upper limit value and lower limit value of the feature amount of the defect image 52, and may be a range between such an upper limit value and a lower limit value.

In step 406, the image processing device 10 displays the detectable range 60 estimated in step 405 on the display 44.

In step 407, the image processing device 10 sets a threshold value of the feature amount of the defect image 52 that defines the condition for detecting the defect image 52 as a defect, based on the detectable range 60 which is estimated in step 405.

In step 408, the image processing device 10 determines whether the verification of whether the defect image 52 can be detected for all the combinations of the defect parameter and the background parameter which are set in each of steps 401 and 402 is completed.

FIG. 5 is an explanatory diagram showing an example of a table of defect parameters and background parameters according to this embodiment.

In this example, the defect parameters specify the shape of the defect image 52 (three types of "A" shape, "B" shape, and "C" shape), the size of the defect image 52 (three types of "large", "medium", and "small"), and the contrast ratio of the defect image 52 to the background image 51 (three types of "high", "medium", and "low"). The background parameters specify the texture pattern of the background image 51 (three types of "X" pattern, "Y" pattern, and "Z" pattern), and the brightness of the background image 51 (three types of "high", "medium", and "low"). In this example, there are 9×6=54 combination patterns of defect parameters and background parameters, and the verification process of step 404 is executed for each combination.

Further, the verification process of step 404 may be performed, while automatically altering the defect parameter or the background parameter according to a predetermined rule or irregularly (randomly) altering the defect parameter or the background parameter. Further, the verification process of step 404 may be performed, while finely altering the defect parameter or the background parameter in the vicinity of the detectable upper limit value or the lower limit value of the feature amount of the defect image 52 and roughly altering the defect parameter or the background parameter in the other range. Further, the verification process of step 404 may be performed, while finely altering the defect parameter or the background parameter at uniform intervals between the detectable upper limit value and the lower limit value of the feature amount of the defect image 52.

Figure 6:
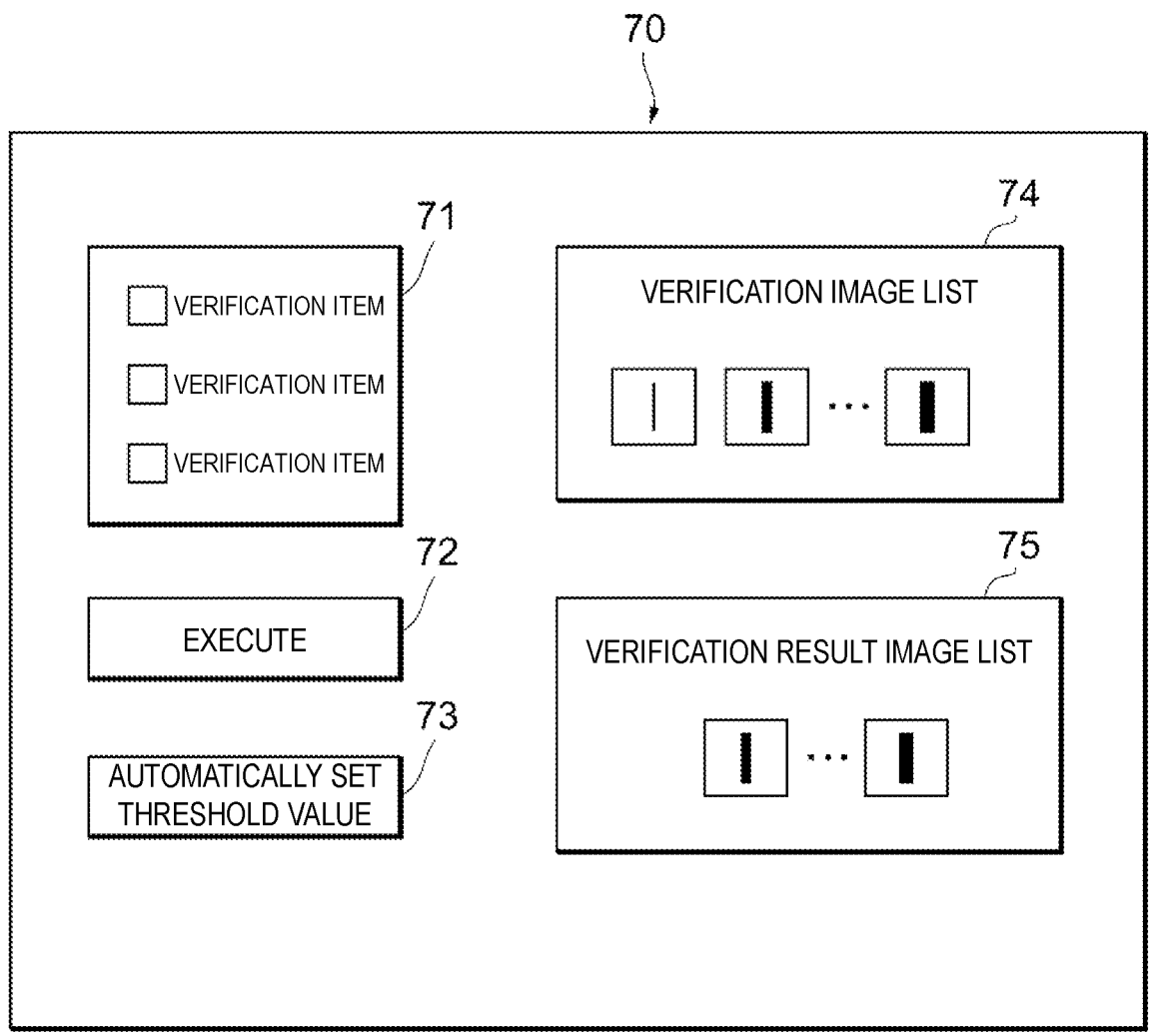
FIG. 6 is an explanatory view showing an example of a display screen according to this embodiment.

FIG. 6 is an explanatory diagram showing an example of the display screen 70 according to the present embodiment.

The display screen 70 is an example of a screen displayed on the display 44 when verifying whether the defect image 52 can be detected. Reference numeral 71 indicates a window for displaying a plurality of evaluation items of the defect image 52. The evaluation items are, for example, items such as "line width", "brightness", and "contrast ratio" of the defect image 52. For example, when the evaluation item of "line width" is selected by the inspector, whether the defect image 52 can be detected is verified for various line widths of the defect image 52. Reference numeral 72 indicates a button instructing execution of verification for the evaluation item selected from the window 71. Reference numeral 74 indicates a list of all the composite images 50 generated at the time of verification of the evaluation items selected from the window 71. Reference numeral 75 indicates a list of the composite images 50 within the detectable range of the defect image 52 among all the composite images 50 generated at the time of verification. Reference numeral 73 indicates a button instructing that the threshold value of the feature amount of the defect image 52 is automatically set based on the detectable range 60.

The image processing device 10 functions as a means for executing the above-mentioned image processing method (steps 401 to 408 of FIG. 4), and such means does not need to be necessarily realized by collaboration of the hardware resources of the image processing device 10 and the image processing program 20, and may be realized by, for example, the use of a dedicated hardware resource of the image processing device 10 (for example, an application specific integrated circuit (ASIC), a field programmable gate array (FPGA) or the like). The image processing program 20 may include a software module that executes each of the steps 401 to 408 of the above-mentioned image processing method.

A part or all of the above-described embodiments may be described as the following appendix, but are not limited to the following.

APPENDIX 1

An image processing device 10 including:

an image processing unit which superimposes the defect image 52 on the background image 51 with the original image of the inspection subject as the background image 51 and performs image processing for altering the display format of the defect image 52 or the display format of the background image 51, thereby generating a plurality of composite images 50 having different ways of seeing the defect image 52 with respect to the background image 51;

a verification unit which verifies whether the defect image 52 is detectable from each of the plurality of composite images 50;

an estimation unit which estimates the detectable range 60 of the defect image 52 based on a verifying result of whether the defect image is detectable; and a display unit which displays the detectable range 60.

APPENDIX 2

The image processing device 10 described in Appendix 1, in which the image processing for altering the display format of the defect image 52 includes:
a process of altering the shape of the defect image 52,
a process of altering a position or a posture of the defect image 52 with respect to the background image 51,
a process of altering the size of the defect image 52,
a process of enlarging or reducing the defect image 52, or
a process of altering a contrast ratio of the defect image 52 to the background image 51.

APPENDIX 3

The image processing device 10 described in Appendix 1 or 2, in which the image processing for altering the display format of the background image 51 includes:
a process of altering a texture pattern of the background image 51,
a process of altering a brightness of the background image 51,
a process of superimposing a noise pattern on the background image 51,
a process of superimposing a shadow pattern on the background image 51,
a process of rotating the background image 51 with respect to the defect image 52,
a process of enlarging or reducing the background image 51, or
a process of altering the contrast ratio of the background image 51 to the defect image 52.

APPENDIX 4

The image processing device 10 described in any one of Appendices 1 to 3, further including a setting unit which sets a threshold value of a feature amount of the defect image 52 which defines a condition for detecting the defect image 52 as a defect, based on a detectable range 60.

APPENDIX 5

An image processing method of causing a computer system to execute:
a step 403 of superimposing the defect image 52 on the background image 51 with the original image of the inspection subject as the background image 51 and performing image processing for altering the display format of the defect image 52 or the display format of the background image 51, thereby generating a plurality of composite images 50 having different ways of seeing the defect image 52 with respect to the background image 51;
a step 404 of verifying whether the defect image 52 is detectable from each of the plurality of composite images 50;
a step 405 of estimating the detectable range 60 of the defect image 52 based on a verifying result of whether the defect image is detectable; and
a step 406 of displaying the detectable range 60.

APPENDIX 6

An image processing program 20 which causes a computer system to execute:
a step 403 of superimposing the defect image 52 on the background image 51 with the original image of the inspection subject as the background image 51 and performing image processing for altering the display format of the defect image 52 or the display format of the background image 51, thereby generating a plurality of composite images 50 having different ways of seeing the defect image 52 with respect to the background image 51;
a step 404 of verifying whether the defect image 52 is detectable from each of the plurality of composite images 50;
a step 405 of estimating the detectable range 60 of the defect image 52 based on a verifying result of whether the defect image is detectable; and
a step 406 of displaying the detectable range 60.

The invention claimed is:

1. An image processing device, comprising:
a processor, configured to:
set a defect parameter that specifies a display format of a defect image;
set a background parameter that specifies a display format of a background image;
superimpose the defect image on the background image with an original image of an inspection subject as the background image and perform image processing for altering the display format of the defect image or a display format of the background image based on the defect parameter and the background parameter, thereby generating a plurality of composite images having different ways of seeing the defect image with respect to the background image;
verify whether the defect image is detectable from each of the plurality of composite images by altering the defect parameter or the background parameter according to a detectable upper limit value and a detectable lower limit value of a feature amount of the defect image in the plurality of composite images to generate a verifying result with respect to each of the plurality of composite images; and
estimate a detectable range of the defect image based on the verifying result with respect to each of the plurality of composite images; and
a display which displays the detectable range.

2. The image processing device according to claim 1, wherein the image processing for altering the display format of the defect image comprises:
a process of altering a shape of the defect image,
a process of altering a position or a posture of the defect image with respect to the background image,
a process of altering a size of the defect image,
a process of enlarging or reducing the defect image, or
a process of altering a contrast ratio of the defect image to the background image.

3. The image processing device according to claim 1, wherein the image processing for altering the display format of the background image comprises:
a process of altering a texture pattern of the background image,
a process of altering a brightness of the background image,
a process of superimposing a noise pattern on the background image, a process of superimposing a shadow pattern on the background image, a process of rotating the background image with respect to the defect image, a process of enlarging or reducing the background image, or a process of altering a contrast ratio of the background image with respect to the defect image.

4. The image processing device according to claim 1, wherein the processor is further configured to:

set a threshold value of a feature amount of the defect image which defines a condition for detecting the defect image as a defect, based on the estimated detectable range of the defect image.

5. An image processing method of causing a computer system to:

set a defect parameter that specifies a display format of a defect image;

set a background parameter that specifies a display format of a background image;

superimpose the defect image on the background image with an original image of an inspection subject as the background image and perform image processing for altering the display format of the defect image or a display format of the background image based on the defect parameter and the background parameter, thereby generating a plurality of composite images having different ways of seeing the defect image with respect to the background image;

verify whether the defect image is detectable from each of the plurality of composite images by altering the defect parameter or the background parameter according to a detectable upper limit value and a detectable lower limit value of a feature amount of the defect image in the plurality of composite images to generate a verifying result with respect to each of the plurality of composite images;

estimate a detectable range of the defect image based on the verifying result with respect to each of the plurality of composite images; and display the detectable range.

6. An image processing non-transitory computer readable medium, storing a program which causes a computer system to:

set a defect parameter that specifies a display format of a defect image;

set a background parameter that specifies a display format of a background image;

superimpose the defect image on the background image with an original image of an inspection subject as the background image and perform image processing for altering the display format of the defect image or a display format of the background image based on the defect parameter and the background parameter, thereby generating a plurality of composite images having different ways of seeing the defect image with respect to the background image;

verify whether the defect image is detectable from each of the plurality of composite images by altering the defect parameter or the background parameter according to a detectable upper limit value and a detectable lower limit value of a feature amount of the defect image in the plurality of composite images to generate a verifying result with respect to each of the plurality of composite images;

estimate a detectable range of the defect image based on the verifying result with respect to each of the plurality of composite images; and displaying the detectable range.

7. The image processing device according to claim 1, wherein the defect parameter specifies a shape of the defect image.

8. The image processing device according to claim 1, wherein the defect parameter specifies a position or posture of the defect image with respect to the background image.

9. The image processing device according to claim 1, wherein the defect parameter specifies a size of the defect image.

10. The image processing device according to claim 1, wherein the defect parameter specifies a magnification ratio or a reduction ratio of the defect image.

11. The image processing device according to claim 1, wherein the defect parameter specifies a contrast ratio of the defect image.

12. The image processing device according to claim 1, wherein the background parameter specifies a texture pattern of the background image.

13. The image processing device according to claim 1, wherein the background parameter specifies a brightness pattern of the background image.

14. The image processing device according to claim 1, wherein the background parameter specifies a noise pattern or a shadow pattern superimposed on the background image.

15. The image processing device according to claim 1, wherein the background parameter specifies a position or posture of the background image with respect to the defect image.

16. The image processing device according to claim 1, wherein the background parameter specifies a magnification ratio or a reduction ratio of the background image.

17. The image processing device according to claim 1, wherein the background parameter specifies a contrast ratio of the background image.

* * * * *